United States Patent
Sugaya et al.

(10) Patent No.: US 8,191,066 B2
(45) Date of Patent: May 29, 2012

(54) CONTINUOUSLY LOADING SERIES OF DATA WHETHER DATA IS REQUESTED OR NOT, IN RESPONSE TO END COMMAND UNLOADING THE DATA IN DESCENDENT ORDER OF REFERENCE PROBABILITY

(75) Inventors: Natsuko Sugaya, Inagi (JP); Katsushi Yako, Yokohama (JP); Akiyoshi Nakamizo, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 1111 days.

(21) Appl. No.: 12/048,713

(22) Filed: Mar. 14, 2008

(65) Prior Publication Data
US 2009/0165013 A1    Jun. 25, 2009

(30) Foreign Application Priority Data
Dec. 21, 2007   (JP) ................................. 2007-330412

(51) Int. Cl.
*G06F 9/46* (2006.01)
*G06F 12/00* (2006.01)
*G06F 13/00* (2006.01)

(52) U.S. Cl. ...... 718/100; 710/1; 711/100; 711/E12.001

(58) Field of Classification Search ...... 710/1; 718/100, 718/104, 105; 711/100
See application file for complete search history.

(56) References Cited

U.S. PATENT DOCUMENTS

| | | | | |
|---|---|---|---|---|
| 5,765,213 | A | * | 6/1998 | Ofer ............................... 711/213 |
| 5,909,566 | A | * | 6/1999 | Cai et al. ........................ 712/207 |
| 6,067,565 | A | * | 5/2000 | Horvitz .......................... 709/218 |
| 6,567,894 | B1 | * | 5/2003 | Hsu et al. ....................... 711/137 |
| 6,681,295 | B1 | * | 1/2004 | Root et al. ..................... 711/128 |
| 6,928,451 | B2 | * | 8/2005 | Mogi et al. .................... 707/718 |
| 2007/0005905 | A1 | * | 1/2007 | Yasue et al. ................... 711/137 |

FOREIGN PATENT DOCUMENTS

| | | | |
|---|---|---|---|
| JP | 9-026906 | | 1/1997 |
| JP | 09026906 A | * | 1/1997 |
| JP | 09128195 A | * | 5/1997 |
| JP | 2006-260067 A | | 9/2006 |

OTHER PUBLICATIONS

Patterson et al., Informed Prefetching and Caching, May 11, 1995, ACM, 1-26.*

* cited by examiner

*Primary Examiner* — Meng An
*Assistant Examiner* — Abu Z Ghaffari
(74) *Attorney, Agent, or Firm* — Mattingly & Malur, PC

(57) ABSTRACT

In response to an activation of a data processing system, a request for processing is accepted in parallel with loading a series of data (a data body) from an external storage into a main memory independent of whether the processing of individual data is requested or not, and if target data of the request for processing is not loaded into the main memory, apparent system starting time is reduced by executing processing corresponding to the request after the target data is loaded into the main memory.

14 Claims, 13 Drawing Sheets

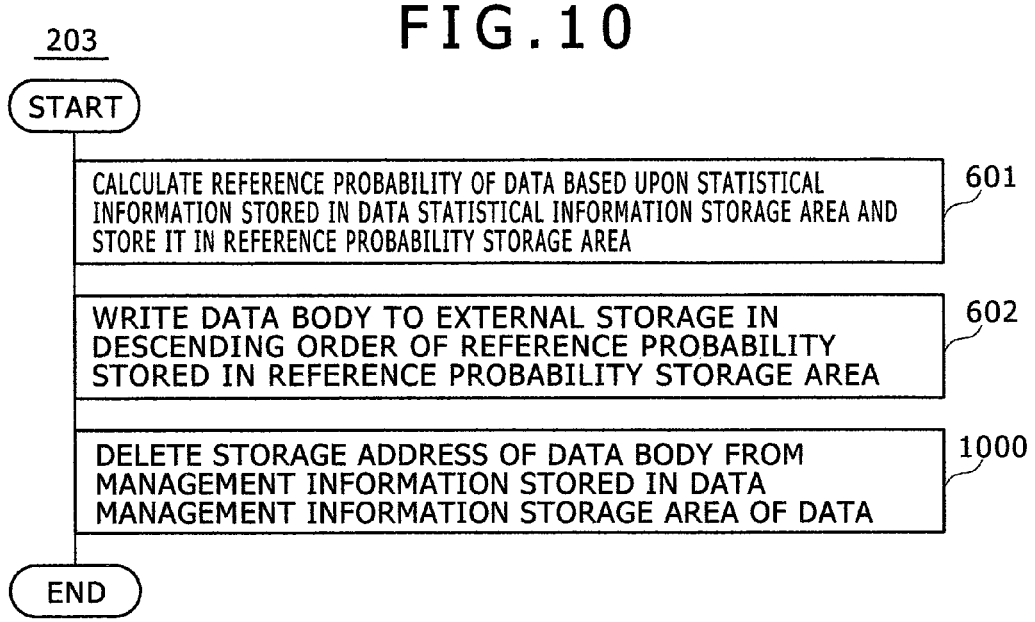
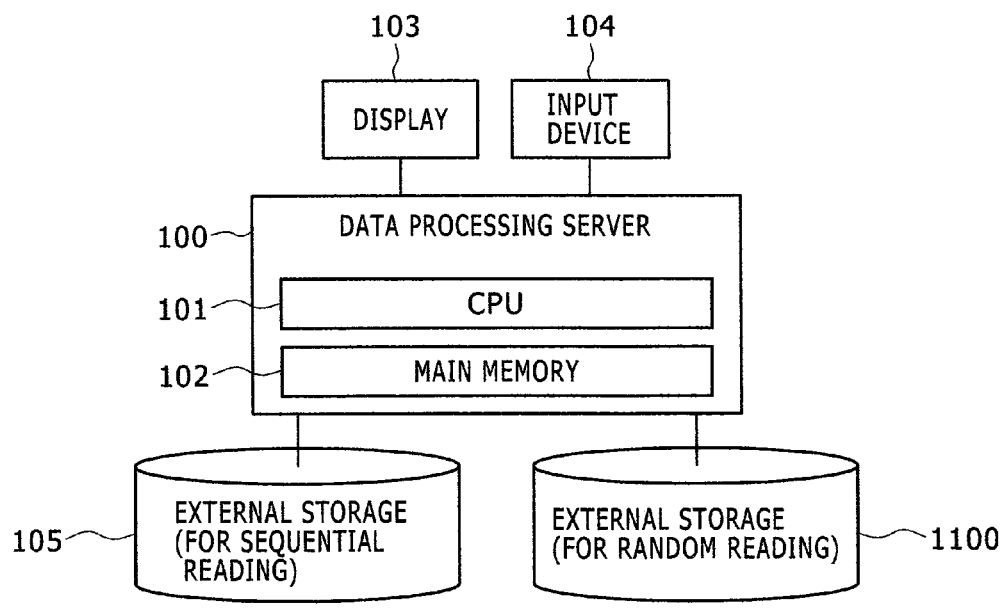

FIG.14

| DATA NUMBER | DATA NAME | CREATION DATE | DATA CAPACITY | FORMER DATA NUMBER | BODY STORAGE ADDRESS |
|---|---|---|---|---|---|
| 00000000 | aaa.txt | 2007/08/10 | 12KB | null | address0 |
| 00000001 | bbb.xls | 2007/08/12 | 78KB | null | address1 |
| 00000002 | ccc.doc | 2007/08/13 | 43KB | null | address2 |
| 00000003 | ddd.cvs | 2007/08/13 | 28KB | null | address3 |
| : | : | : | : | : | : |
|  |  |  |  |  |  |
|  |  |  |  |  |  |

~205

| DATA NUMBER | DATA NAME | CREATION DATE | DATA CAPACITY | FORMER DATA NUMBER | BODY STORAGE ADDRESS |
|---|---|---|---|---|---|
| 00000000 | aaa.txt | 2007/08/10 | 12KB | null | address0 |
| 00000001 | bbb.xls | 2007/08/12 | 78KB | null | address1 |
| 00000002 | ccc.doc | 2007/08/13 | 43KB | null | address2 |
| 00000003 | ddd.cvs | 2007/08/13 | 28KB | null | address3 |
| : | : | : | : | : | : |
| 00001203 | ccc.doc | 2007/08/22 | 52KB | 00000002 | address1203 |
|  |  |  |  |  |  |

~205b

CONTINUOUSLY LOADING SERIES OF DATA WHETHER DATA IS REQUESTED OR NOT, IN RESPONSE TO END COMMAND UNLOADING THE DATA IN DESCENDENT ORDER OF REFERENCE PROBABILITY

PRIORITY

The present application claims priority from Japanese application JP 2007-330412, filed Dec. 21, 2007.

BACKGROUND OF THE INVENTION

The present application claims priority from Japanese application JP2007-330412 filed Dec. 21, 2007, the content of which is hereby incorporated by reference into this application. The present invention relates to a data processing method of reducing time since the activation of a system is started until data processing is enabled and a data processing system for enabling the data processing method.

An online transaction system is applied in various locations such as a general enterprise and public facilities, and high speed and continuity are demanded for realized service.

In view of high speed, as the address space of a main memory to which a CPU is accessible is extended and a price of the main memory falls, an in-memory data processing system where all data is loaded into the main memory and is processed there is realized.

In view of continuity, even if a system is suspended because of regular maintenance and others, the stop time of service is required to be as short as possible to minimum an effect upon users. However, in the in-memory data processing system, as disclosed in JP-A No. 1997-26906, all data is required to be loaded from an external storage such as a magnetic disk into the main memory in activating the system.

SUMMARY OF THE INVENTION

In the above-mentioned related art, the load time increases in proportion to the quantity of data loaded into the main memory and the activation of the system requires much time. It is demanded to possibly reduce the starting time and to reduce service stop time.

It is estimated that the quantity of data processed by the in-memory data processing system amounts to a few hundred GB and a bulk main memory according to it is required. It is considered that a low-priced magnetic disk is used for an external storage placed as a backup for a quantity in which the main memory is costly. For example, when a magnetic disk the transfer rate of which is 100 MB/s is used, it takes approximately 17 minutes to load data of 100 GB and service stop time is extended by that amount. Even if a high-priced high-speed external storage having a cache storage is used, the effect of the cache cannot be expected in initial loading.

In a data processing system where a large quantity of data is initially required to be loaded into a main memory even if the data processing system is not the in-memory data processing system which is a typical example as described above, the reduction of starting time (time till the start of data processing) is demanded.

The invention relates to a data processing method and a data processing system where apparent system starting time can be reduced by loading a data body (a series of data) in parallel with the acceptance of processing in activating the system. The reduction of the system starting time in this case means the reduction of time from when various programs including an OS of the data processing system are activated until service is started.

An embodiment of the invention is based upon a data processing method in a data processing system that applies processing to data in a main memory, and is equivalent to a data processing method and a data processing system where a request for processing is accepted in parallel with loading a series of data (a data body) configured by individual data from an external storage into the main memory independent of whether the processing of individual data is requested or not at the same time as the activation of the data processing system and when target data corresponding to the request for processing is not loaded into the main memory, processing corresponding to the request for processing is executed after the target data is loaded into the main memory.

Another embodiment of the invention is equivalent to a data processing method and a data processing system where when target data corresponding to a request for processing is not loaded into a main memory, the start of the execution of the processing is awaited until the target data corresponding to the request for processing is loaded into the main memory.

Further another embodiment of the invention is equivalent to a data processing method and a data processing system where when data processing is ended, a series of data including target data the processing of which is executed is unloaded from a main memory into an external storage as a data body.

Furthermore another embodiment of the invention is equivalent to a data processing method and a data processing system where reference probability which is the probability of the reference and the updating of individual data is calculated based upon at least one of information input from an input device and statistical information of the processing of individual data and individual data is unloaded from a main memory into an external storage in descending order of reference probability.

Furthermore another embodiment of the invention is equivalent to a data processing method and a data processing system where when a series of data unloaded into an external storage is loaded into a main memory at the same time as the reactivation of the data processing system to resume data processing, the series of data loaded into the main memory is sequentially read from the external storage in descending order of reference probability.

Furthermore another embodiment of the invention is equivalent to a data processing method and a data processing system where when individual data sequentially read from an external storage in descending order of reference probability is stored in a main memory, a storage address of the individual data in the main memory is set in management information for managing the individual data.

Furthermore another embodiment of the invention is equivalent to a data processing method and a data processing system where management information is stored in a storage area which is a non-volatile memory included in a main memory.

Furthermore another embodiment of the invention is equivalent to a data processing method and a data processing system where individual data is unloaded from a main memory into an external storage in descending order of reference probability as a series of data and is unloaded from the main memory into another external storage.

Furthermore another embodiment of the invention is equivalent to a data processing method and a data processing system where a series of data unloaded into an external storage is loaded into a main memory at the same time as the reactivation of the data processing system to resume the processing by the data processing system, the series of data loaded into the main memory is sequentially read from the external storage in descending order of reference probability, and when target data corresponding to a request for processing is not loaded into the main memory, it is read from another external storage to the main memory.

According to the invention, apparent system starting time can be reduced by starting the acceptance of a request in parallel with loading a series of data when the system is activated.

BRIEF DESCRIPTION OF THE DRAWINGS

FIG. 10 is a problem analysis diagram showing the contents of processing by a data unloading controller in the second embodiment;

FIG. 11 shows the hardware configuration of a third embodiment;

FIG. 14 shows an example of the configuration of data management information in the third embodiment.

DETAILED DESCRIPTION OF THE PREFERRED EMBODIMENTS

Best embodiments will be described concretely below.

First Embodiment

Figure 1:
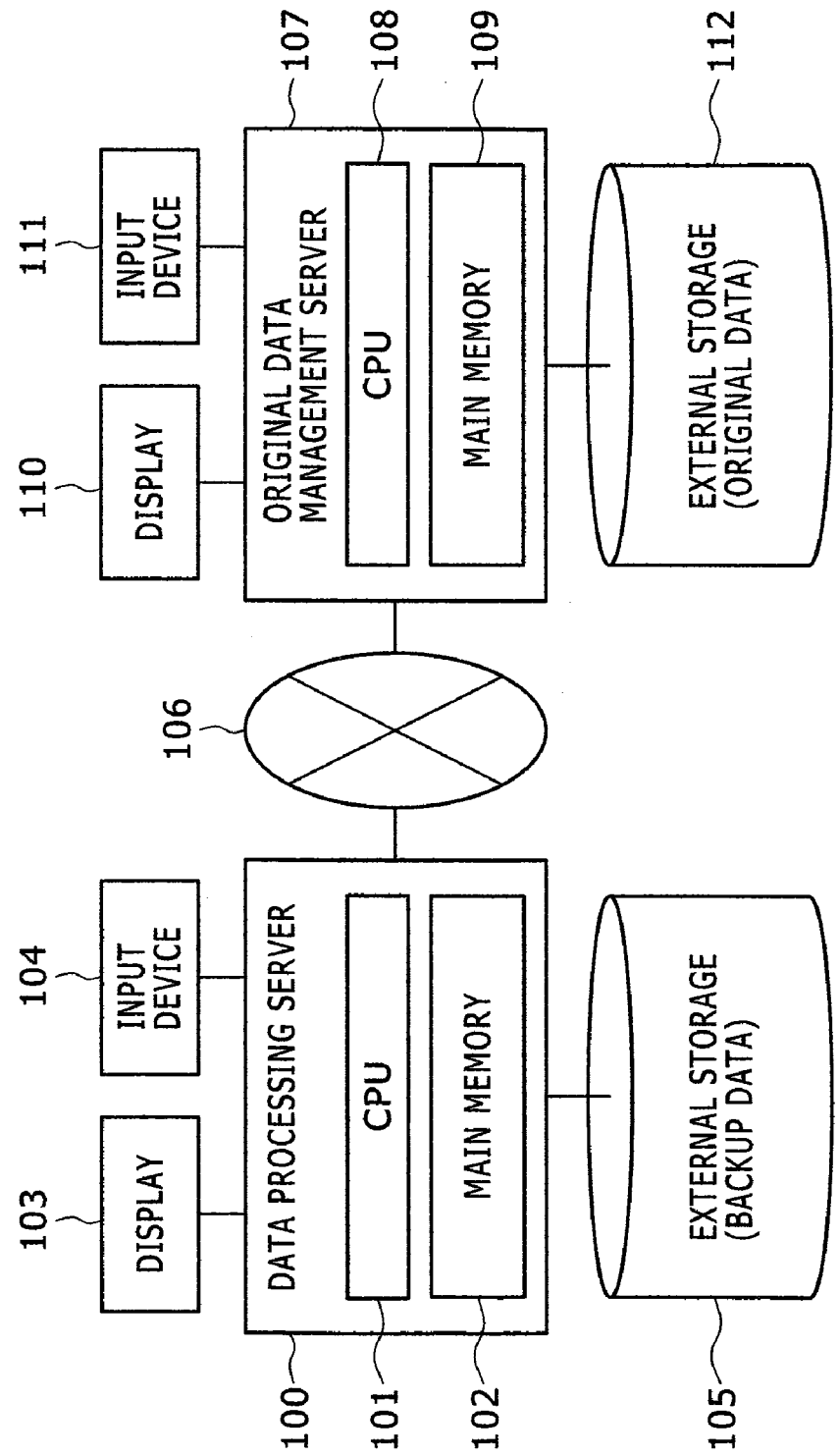
FIG. 1 shows the hardware configuration of a first embodiment.

FIG. 1 shows the hardware configuration of a data processing system equivalent to this embodiment. The data processing system equivalent to this embodiment includes a data processing server 100 configured by CPU 101 and a main memory 102, a display 103, an input device 104 and an external storage 105 respectively connected to the data processing server 100 as shown in FIG. 1. The external storage 105 is used for storing data including the result of processing when the data processing system ends the processing.

In addition, an original data management server 107 including CPU 108 and a main memory 109 is connected to the data processing server 100 via a communication line 106 such as a local area network (LAN). A display 110, an input device 111 and an external storage 112 are also similarly connected to the original data management server 107. Original data to be initial data of the data processing server 100 is stored in the external storage 112.

In initial activation of the data processing system, the data processing server 100 requests original data of the original data management server 107 and stores acquired data in the main memory 102. Data processing is applied to the data stored in the main memory 102 and the data of a processing result (or data when the processing is ended) when the processing of the data processing system is ended is stored in the external storage 105. In a second or later activation of the data processing system, the data processing server 100 stores the (backup) data stored in the external storage 105 when the processing is last ended in the main memory 102 and executes processing.

Figure 2:
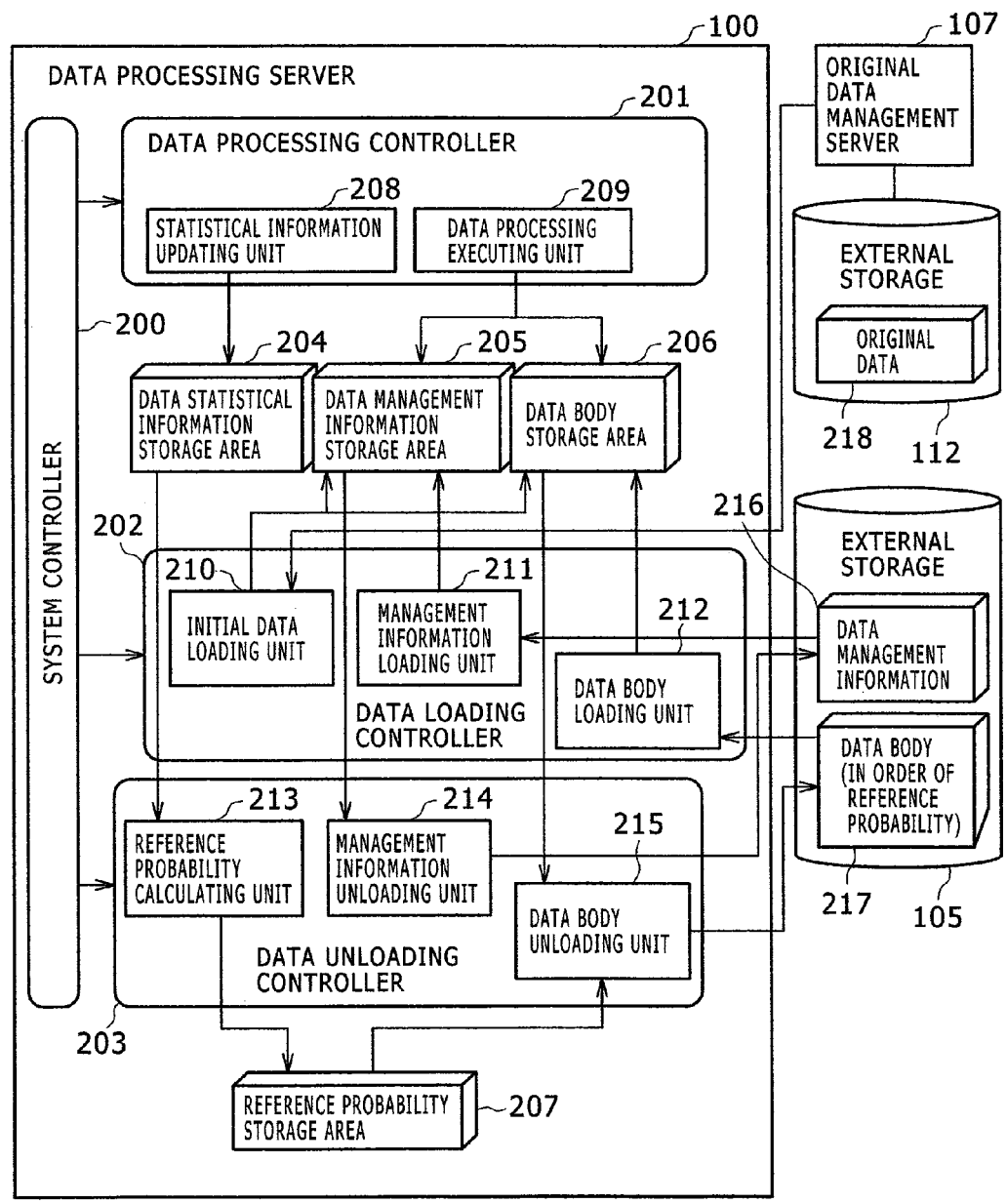
FIG. 2 shows the module configuration of the first embodiment.

FIG. 2 shows a module configuration in the data processing system equivalent to this embodiment. Each processing program as a system controller 200, a data processing controller 201, a data loading controller 202 and a data unloading controller 203 is stored in the main memory 102 of the data processing server 100, and a data statistical information storage area 204, a data management information storage area 205, a data body storage area 206 and a reference probability storage area 207 are secured. Each processing program is executed by the CPU 101 of the data processing server 100.

The drawings are shown and are referred to in a range enough to explain this embodiment to avoid intricacy. As a concrete example of omission, an OS can be given. The activation of the system will be described later, however, as this embodiment is related to the initial loading of data, the description will start from a condition in which the OS is activated and each processing program is loaded into the main memory 102.

The data processing controller 201 includes a statistical information updating unit 208 and a data processing executing unit 209. The data loading controller 202 includes an initial data loading unit 210, a management information loading unit 211 and a data body loading unit 212. The data unloading controller 203 includes a reference probability calculating unit 213, a management information unloading unit 214 and a data body unloading unit 215. Data management information 216 and a data body 217 are stored as backup data in the external storage 105 connected to the data processing server 100. Original data 218 to be initial data of the data processing system is stored in the external storage 112 connected to the original data management server 107.

When the data processing system is first activated, no data management information 216 and no data body 217 which are respectively backup data (also similarly in the following) are stored in the external storage 105 yet. Therefore, the data loading controller 202 requests original data 218 of the original data management server 107 and stores it in the data management information storage area 205 and the data body storage area 206. The data loading controller stores a data body of the original data 218 in the data body storage area 206 and stores data management information for managing the data body in the data management information storage area 205.

The data body means a series of data which is a set of individual data and means data to be an object processed by the data processing system equivalent to this embodiment. Data management information means information for managing an address at which individual data is stored and can be also called management information of the data body as a whole.

The data processing controller 201 accepts a request for processing from an external device, applies processing according to the request to management information of target data in the request for processing stored in the data management information storage area 205 and a body of the target data stored in the data body storage area 206, and updates statistical information of the target data stored in the data statistical information storage area 204. When no data body is stored in the data body storage area 206 yet in starting the processing of the target data, the data processing controller 201 waits until the data body is loaded.

When processing by the data processing system is ended, the data unloading controller 203 stores data management information stored in the data management information storage area 205 in the external storage 105 as data management information 216. Afterward, the data unloading controller calculates the reference probability of each data using statistical information stored in the data statistical information storage area 204 and stores it in the reference probability storage area 207. The data unloading controller stores a data body stored in the data body storage area 206 in descending order of the reference probability in the external storage 105 as a data body 217. The data body 217 is stored in a sequential area of the external storage 105 in the descending order of the reference probability.

When the data processing system is activated a second time or later, the data loading controller 202 loads data management information 216 and a data body 217 respectively stored in the external storage 105 in place of the original data 218 and stores them in the data management information storage area 205 and in the data body storage area 206.

Figure 3:
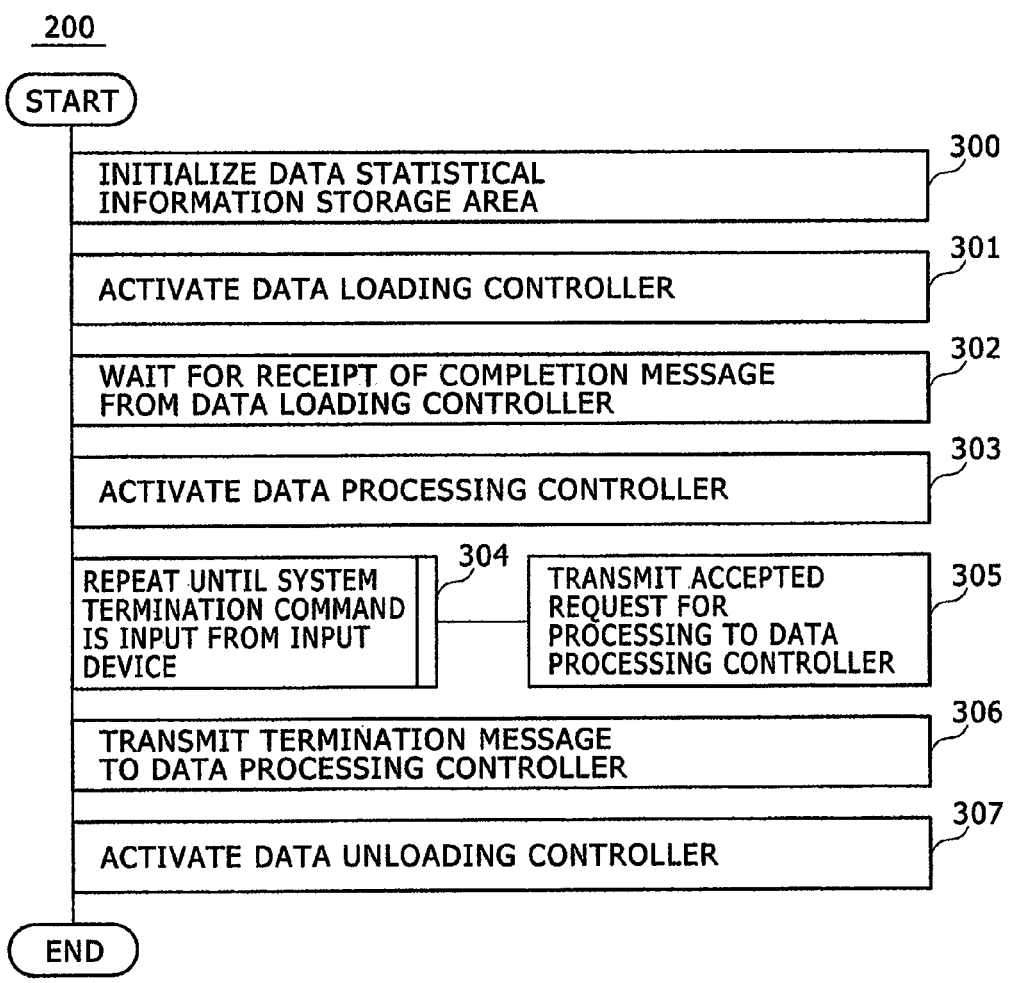
FIG. 3 is a problem analysis diagram showing the contents of processing by a system controller in the first embodiment.

The contents of processing by each controller will be described using a problem analysis diagram (PAD) in detail below. Referring to FIG. 3, the contents of processing by the system controller 200 will be described below. The system controller 200 initializes the data statistical information storage area 204 (S300). Statistical information includes a frequency of processing applied to data (a reference frequency and an updating frequency) and the latest processing date to be basic information required for calculating reference probability in the data unloading controller 203. The system controller activates the data loading controller 202 to load data (S301). The system controller waits for the receipt of a completion message from the data loading controller 202 (S302). When the system controller receives the completion message from the data loading controller 202, it activates the data processing controller 201 (S303). The system controller starts the acceptance of a request for data processing and repeats a process for transmitting the accepted request for processing to the data processing controller 201 (S305) until a system termination command is input from the input device 104 (S304). When the system termination command is input from the input device 104, the system controller transmits a termination message to the data processing controller 201 (S306) and terminates the data processing. The system controller activates the data unloading controller 203 (S307) to store data management information stored in the data management information storage area 205 and a data body stored in the data body storage area 206 in the external storage 105.

Figure 4:
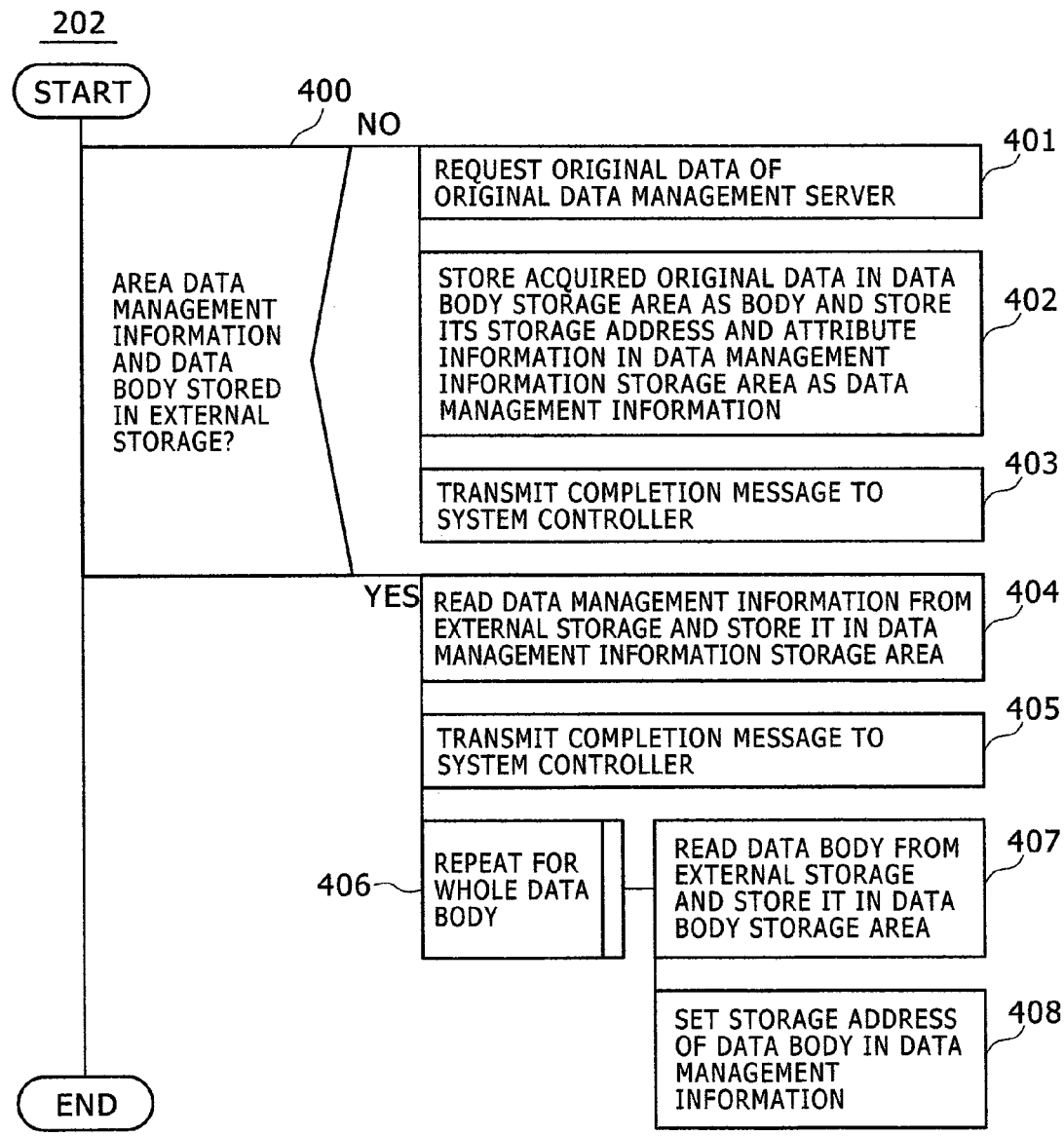
FIG. 4 is a problem analysis diagram showing the contents of processing by a data loading controller in the first embodiment.

Referring to FIG. 4, the contents of processing by the data loading controller 202 will be described below. The data loading controller 202 is activated by the system controller 200 (S301 in FIG. 3). When the data loading controller is activated, it checks whether data management information 216 and a data body 217 are stored in the external storage 105 or not (S400). When the data loading controller judges that they are not stored (judges the activation to be the initial activation of the data processing system), it activates the initial data loading unit 210 to load original data 218 (S401 to S403). When the data loading controller judges that they are stored, it activates the management information loading unit 211 and the data body loading unit 212 to load the data management information 216 and the data body 217 (S404 to S408).

In a process for loading the original data 218, the initial data loading unit 210 requests the original data 218 of the original data management server 107 (S401). The acquired original data 218 is stored in the data body storage area 206 as a data body, and its storage address and attribute information are stored in the data management information storage area 205 as data management information (S402). A completion message is transmitted to the system controller 200 (S403). The system controller 200 resumes the processing when it receives the completion message.

In a process for loading the data management information 216 and the data body 217, the management information loading unit 211 reads the data management information 216 from the external storage 105, stores it in the data management information storage area 205 (S404), and transmits a completion message to the system controller 200 (S405). The system controller 200 resumes the processing when it receives the completion message. The data body loading unit 212 repeats the processing in S407 and S408 for the whole data body in parallel with the resumed processing of the system controller 200 (S406). The data body loading unit reads a data body 217 from the external storage 105 and stores it in the data body storage area 206 (S407). The storage address of the data body is set in management information stored in the data management information storage area 205 (S408). The step for reading the data body 217 (S407) and the step for setting in management information (S408) are alternately executed; however, the steps are a process for sequential reading in terms of the external storage 105.

Figure 5:
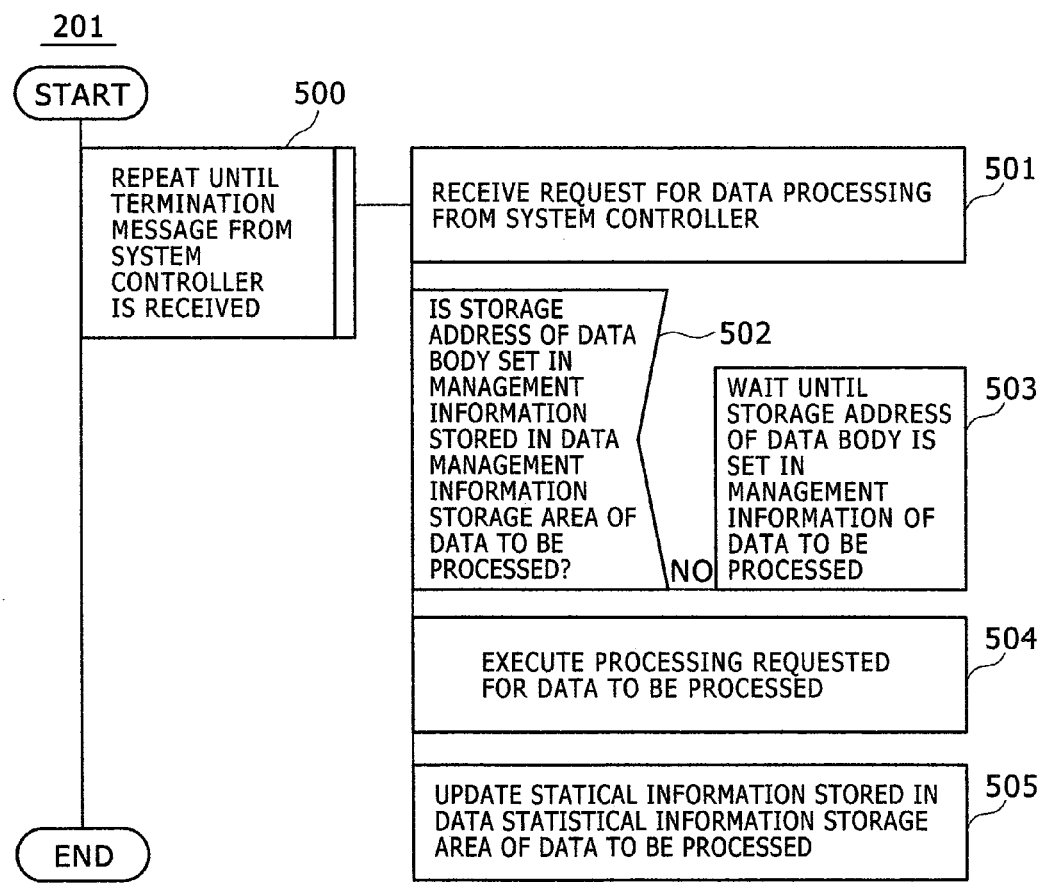
FIG. 5 is a problem analysis diagram showing the contents of processing by a data processing controller in the first embodiment.

Referring to FIG. 5, the contents of processing by the data processing controller 201 will be described below. The data processing controller 201 is activated by the system controller 200 that receives a completion message from the data loading controller 202.

At the time of activation, as for the storage of data management information and a data body in the main memory 102, two states exist. A first state denotes a state that the data body is stored in the data body storage area 206 and management information such as the storage address of the data body is set in the data management information storage area 205. A second state denotes a state that the data body is not stored in the data body storage area 206 yet and management information such as the storage address of the data body is not set in the data management information storage area 205.

When the data processing controller 201 is activated, it repeats steps S501 to S505 until a termination message from the system controller 200 is received (S500). The data processing controller receives a request to process the data from the system controller 200 (S501). The data processing controller checks whether management information such as a storage address of the data body which is a target of the request for processing is stored in the data management information storage area 205 or not (S502). When the management information is not set, the data processing controller waits until management information such as the storage address of the data body to be processed is set in the data management information storage area 205 (S503).

As the data body to be processed is stored in the data body storage area 206 when the management information such as the storage address of the data body to be processed is set in the data management information storage area 205, the data processing executing unit 209 is activated and executes processing requested for the data to be processed (S504).

The statistical information updating unit 208 is activated and statistical information of the data to be processed stored in the data statistical information storage area 204 is updated according to the contents of the processing (S505). The statistical information of the data to be processed includes a frequency of processing (a frequency of reference and a frequency of updating) and the latest processing date for example and the updating of the statistical information means incrementing a frequency of processing and writing the current date in a field of the latest processing date.

Figure 6:
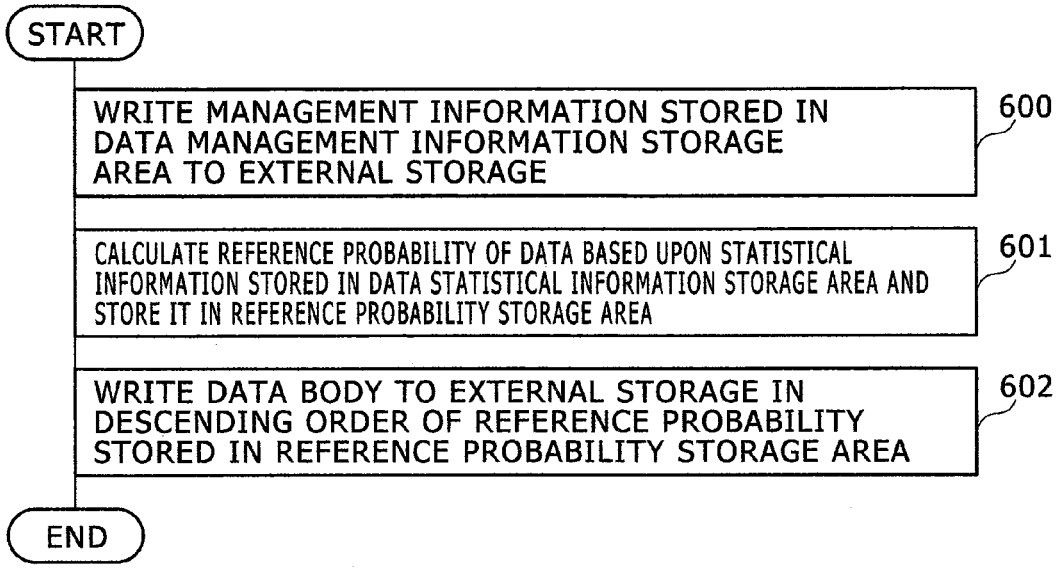
FIG. 6 is a problem analysis diagram showing the contents of processing by a data unloading controller in the first embodiment.

Referring to FIG. 6, the contents of processing by the data unloading controller 203 will be described below. The data unloading controller 203 is activated by the system controller 200 that receives a system termination command input from the input device 104. When the data unloading controller 203 is activated, it activates the management information unloading unit 214 to write the management information stored in the data management information storage area 205 to the external storage 105 as data management information 216 (S600).

The reference probability calculating unit 213 is activated to calculate the reference probability of the data based upon statistical information stored in the data statistical information storage area 204 and to store it in the reference probability storage area 207 (S601). The data body unloading unit 215 is activated to write the data body stored in the data body storage area 206 to the external storage 105 in descending order of the reference probability stored in the reference probability storage area 207 as the data body 217 (S602). The data body 217 is stored in a sequential area of the external storage 105 in the descending order of the reference probability.

Reference probability is acquired by evaluating the simplicity of reference in numeric value and is calculated using statistical information so that data having higher possibility of reference has higher numeric value. For example, the reference probability is calculated using such a predetermined computational expression that data having a greater frequency of processing (a greater frequency of reference and a greater frequency of updating) has higher reference probability and data having the newer latest processing date has higher reference probability.

As described above, apparent system active time can be reduced by starting the acceptance of processing when all management information of data is loaded in the main memory in activating the system and loading the data body in parallel with the acceptance of processing (the execution of the accepted processing when the loading of the data body to be processed is completed), and the stop time of service using this system can be reduced. Further, an expected value of latency when a data body to be processed is not loaded yet is reduced by generating backup data by initially loading the data body having high possibility of being referred to enabled by high-speed sequential reading from the external storage when the system is last ended and by loading the backup data in parallel with the acceptance of processing, time until the loading of the whole data is completed can be reduced, and the maximum performance of the system can be achieved in a short time.

In this embodiment, all original data is acquired from the original data management server in initial activation, however, only predetermined data may be also acquired. For example, when original data is configured by plural tables, only a table to be processed may be also acquired. In this embodiment, while the data processing system is activated, statistical information is updated according to a situation of data processing; however, statistical information may be also acquired only in fixed time immediately after the system is activated. Data required according to the progress of a task may be different and the precision of the simplicity of reference when the system is activated may be enhanced by using statistical information immediately after the activation.

In this embodiment, the order of the unloading of the data body is determined using statistical information data processing; however, it may be also determined according to statistical information input from the input device. For example, when statistical information is used in a stock trade system and others, data processed immediately after the start of trade is often different depending upon information reported in the news and others and it is effective to determine data preferentially loaded according to statistical information such as a frequency of reports.

In this embodiment, all data is written to a sequential area of the external storage in the order of higher possibility of being referred to, however, data is divided into plural groups in the order of higher possibility of being referred to and may be also written to different areas for every group. Hereby, even if a sequential area for writing all data cannot be secured, the writing of all data can be realized with only the increase of reading offset time for the number of groups as a defect.

Second Embodiment

In the first embodiment, when the data processing system is activated a second time or later, a data body is loaded in parallel with the start of the acceptance of a request for processing after data management information is loaded into the main memory. This premises that the main memory is a volatile memory.

However, data management information can be stored in an area configured by a non-volatile memory of a main memory by configuring a part of the main memory by the non-volatile memory such as a flash memory. Hereby, even if a system ends processing, data management information is held in the main memory and the acceptance of a request for processing can be started immediately after the start of the activation of the system. As its management information is estimated approximately at a few percent for a data body estimated at a few hundreds GB, it is a realistic solution to store management information in the non-volatile memory.

Figure 7:
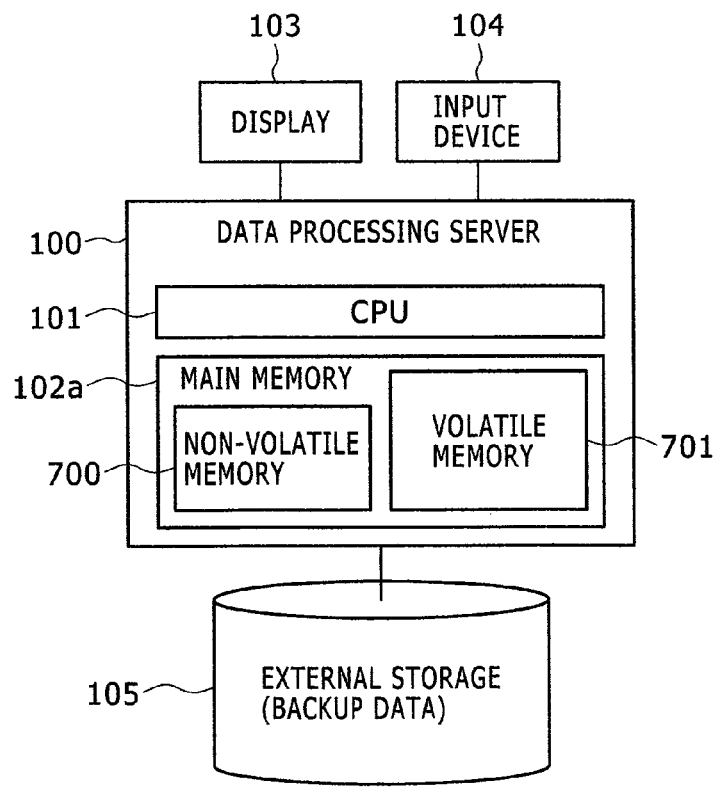
FIG. 7 shows the hardware configuration of a second embodiment.

The configuration of a second embodiment will be described below. This embodiment basically has a similar configuration to that in the first embodiment; however, the configuration of the main memory 102 is different. FIG. 7 shows the hardware configuration of a data processing server 100 in this embodiment. As the configuration of an original data management server 107 and a communication line 106 is the same as that in the first embodiment, they are not shown in FIG. 7. The main memory 102a includes a non-volatile memory 700 and a volatile memory 701. In the non-volatile memory 700, data management information is stored and in the volatile memory 701, the other data and a program module are stored.

Figure 8:
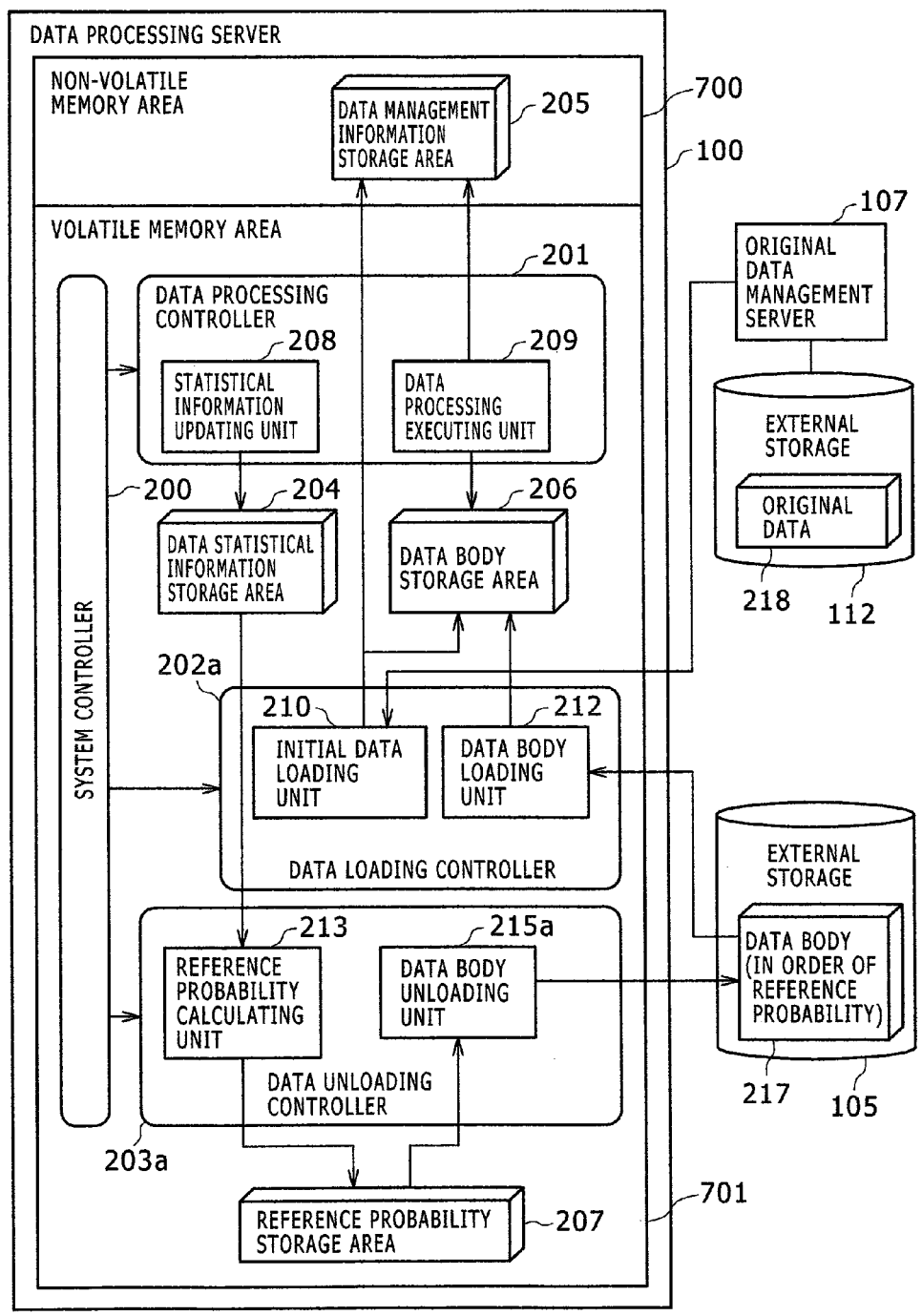
FIG. 8 shows the module configuration of the second embodiment.

FIG. 8 shows a module configuration in this embodiment. In the data processing server 100 in this embodiment, two memory areas of the non-volatile memory area 700 and the volatile memory area 701 exist. In the non-volatile memory area 700, a data management information storage area 205 is secured. In the volatile memory area 701, each processing program as a system controller 200, a data processing controller 201, a data loading controller 202a and a data unloading controller 203a is stored, and a data statistical information storage area 204, a data body storage area 206 and a reference probability storage area 207 are secured.

The data processing controller 201 includes a statistical information updating unit 208 and a data processing executing unit 209 as in the first embodiment. The data loading controller 202a includes an initial data loading unit 210 and a data body loading unit 212. The data unloading controller 203a includes a reference probability calculating unit 213 and a data body unloading unit 215a.

A data body 217 is stored in an external storage 105 connected to the data processing server 100 as backup data. Original data 218 to be initial data of a data processing system is stored in an external storage 112 connected to an original data management server 107.

When the data processing system is first activated, no data body 217 which is backup data is stored in the external storage 105 yet. Therefore, the data loading controller 202a requests original data 218 of the original data management server 107, stores its data management information in the data management information storage area 205 secured in the non-volatile memory area 700, and stores its data body in the data body storage area 206 secured in the volatile memory area 701. The data processing controller 201 accepts a request for processing from an external device, applies processing according to the request to the management information stored in the data management information storage area 205 of data to be processed and the body stored in the data body storage area 206 of the target data, and updates statistical information of the target data stored in the data statistical information storage area 204 secured in the volatile memory area 701. When no data body is stored in the data body storage area 206 in starting the processing of target data, the data processing system waits until it is loaded.

When the data processing system is ended, the data unloading controller 203a calculates the reference probability of each data using the statistical information stored in the data statistical information storage area 204 and stores it in the reference probability storage area 207 secured in the volatile memory area 701. The data unloading controller stores the data body stored in the data body storage area 206 in the external storage 105 in descending order of the reference probability as a data body 217. The data body 217 is stored in a sequential area in the external storage 105 in the descending order of the reference probability. The management information stored in the data management information storage area 205 secured in the non-volatile memory area 700 is kept held.

When the data processing system is activated a second time or later, the data loading controller 202a stores the data body 217 stored in the external storage 105 in the data body storage area 206 in place of its original data 218 and uses the data management information held in the data management information storage area 205 in the non-volatile memory area 700.

The contents of processing by the system controller 200 and the data processing controller 201 in this embodiment are similar to those in the first embodiment. The contents different from those in the first embodiment of processing by the data loading controller 202a and the data unloading controller 203a will be described below.

Figure 9:
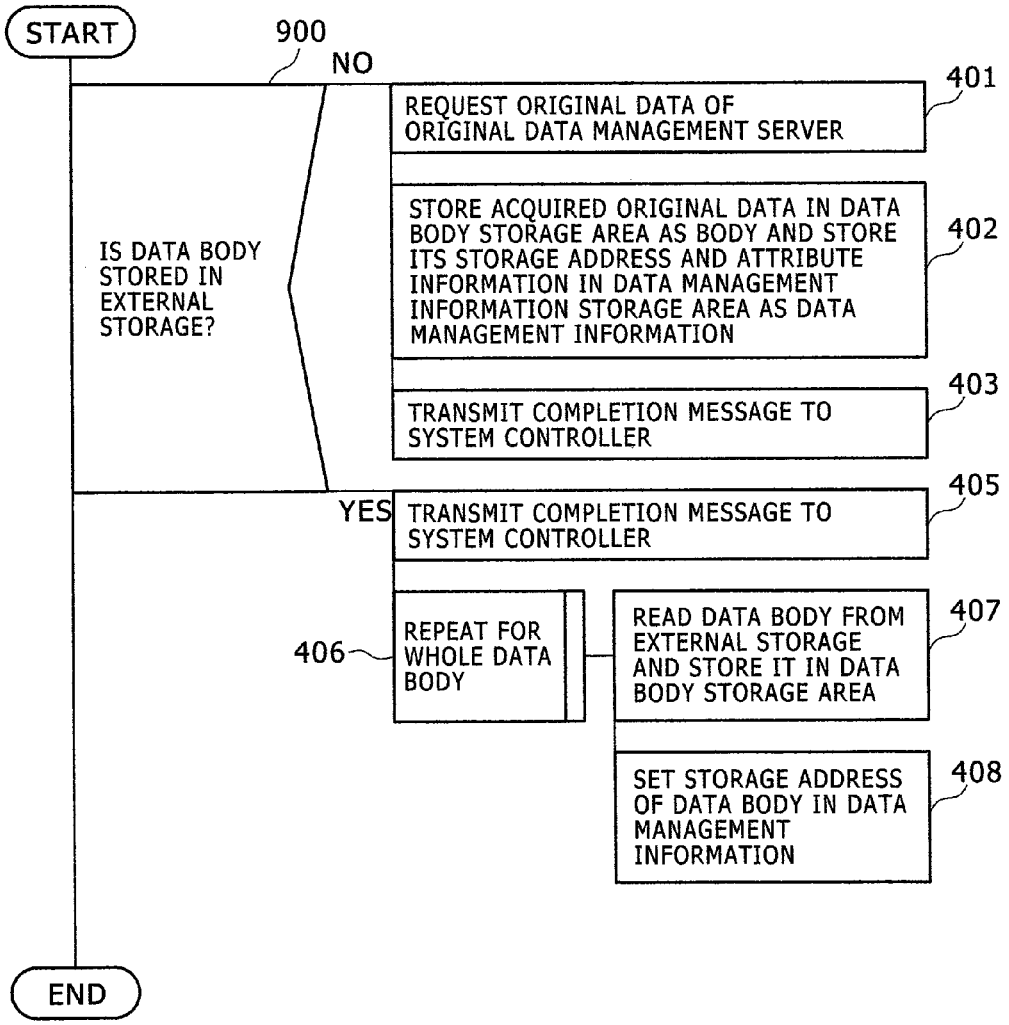
FIG. 9 is a problem analysis diagram showing the contents of processing by a data loading controller in the second embodiment.

Referring to FIG. 9, the contents of processing by the data loading controller 202a will be described below. The data loading controller 202a is activated by the system controller 200 (S301 in FIG. 3). When it is activated, the data loading controller checks whether a data body 217 is stored in the external storage 105 or not (S900). When the data loading controller judges that no data body is stored (judges the activation to be first activation of the data processing system), it activates the initial data loading unit to load original data 218 (S401 to S403). When the data loading controller judges that the data body is stored in the external storage, it activates the data body loading unit 212 to load the data body 217 (S405 to S408).

In loading the original data 218, the initial data loading unit 210 requests the original data 218 of the original data management server 107 (S401). The initial data loading unit stores the acquired original data 218 in the data body storage area 206 secured in the volatile memory area 701 as a data body and stores its storage address and its attribute information in the data management information storage area 205 secured in the non-volatile memory area 700 as data management information (S402). The initial data loading unit transmits a completion message to the system controller 200 (S403). When the system controller 200 receives the completion message, it resumes the processing.

In loading the data body 217, the data body loading unit transmits a completion message to the system controller 200 (S405). When the system controller 200 receives the completion message, it resumes the processing. The data body loading unit 212 repeats processing in S407 and S408 for the whole data body in the step S406 in parallel with the resumed processing of the system controller 200. The data body loading unit reads the data body 217 from the external storage 105 and stores it in the data body storage area 206 secured in the volatile memory area 701 (S407). The data body loading unit sets a storage address of the data body in management information stored in the data management information storage area 205 in the non-volatile memory area 700 (S408). The step for reading the data body 217 in the step 407 (S407) and the step for setting in management information (S408) are alternately executed; however, the steps are sequential reading steps in the terms of the external storage 105.

Referring to FIG. 10, the contents of processing by the data unloading controller 203a will be described below. The data unloading controller 203a is activated by the system controller 200 to which a system termination command is input from an input device 104.

When the data unloading controller 203a is activated, it activates the reference probability calculating unit 213 to calculate the reference probability of data based upon statistical information stored in the data statistical information storage area 204 and to store the reference probability in the reference probability storage area 207 secured in the volatile memory area 701 (S601). For the reference probability, one similar to that of the first embodiment is used. The data unloading controller activates the data body unloading unit 215a to write the data body stored in the data body storage area 206 to the external storage 105 in descending order of the reference probability stored in the reference probability storage area 207 as a data body 217 (S602). The data body 217 is stored in a sequential area in the external storage 105 in the descending order of the reference probability. The data body unloading unit deletes storage addresses of the data body from management information of the data stored in the data management information storage area 205 in the non-volatile memory area 700 (S1000).

As described above, in this embodiment, the management information of the data is stored and held in the non-volatile memory such as a flash memory. When the system is activated a second time or later, the acceptance of processing can be started immediately after activation by using the held management information. As a result, system activation time can be seemingly further reduced, data having high possibility of reference can be initially loaded by high-speed sequential reading from the external storage by loading data in output order in terminating the system, and an expected value of latency when requested data is not loaded yet can be reduced.

Third Embodiment

In the first embodiment and the second embodiment, when the data processing system is activated a second time or later, a data body is loaded into the main memory in parallel with the start of the acceptance of processing and when a data body to be processed is not loaded yet, processing is stopped until the data body is loaded.

In this embodiment, two external storages for sequential reading and for random reading are prepared and backup data is generated in the respective external storages. When a data body to be processed is not loaded from the external storage for sequential reading yet, latency of a request for processing can be reduced by continuing the processing by reading the data body from the external storage for random reading without having an effect upon the external storage during sequential reading.

It means the following to have no effect upon the external storage. When data stored in a sequential area is sequentially read if a magnetic disk is used for the external storage, the seek time of a head for reading can be reduced and, therefore, a head position is prevented from greatly varying. When input-output to/from the magnetic disk is suspended, seek is once required after resumption in the case of the magnetic disk a head position of which returns to a home position, however, seek time can remain once.

When a system of redundant arrays of inexpensive disks (RAID) having a function for quick reading is used for the external storage, sequential data is initially read from the disk, is stored in a cache memory in a controller of the RAID system, and read time viewed from a processing server is reduced. Therefore, even if sequential reading is suspended, sequential former data at the time of suspension exists in the cache memory. In the case of resumption, the data in the cache memory is read and further, the initial reading can resume. Random access to data has only to be prevented from having an effect upon the function for the initial reading.

Therefore, a RAID system provided with areas for sequential reading and for random reading may be also prepared. As the RAID system is provided with plural interfaces (plural paths) with servers and the function for initial reading is independently controlled for every interface, the external storage during sequential reading can be prevented from being influenced if storage areas for sequential reading and for random reading are provided in the same RAID system and different interfaces (different paths) are used from the servers. When the function for initial reading is independently controlled for every volume (storage area) in the RAID system, the volume has only to be divided.

After sequential reading is suspended and processing is applied to data accessed at random, the data body is reloaded from the external storage area for sequential reading. When the target data accessed at random is updated, the updated data is overwritten by the sequentially read data before update. Therefore, the data before update and the updated data are handled as separate data by assigning a new number to the updated data to prevent overwriting.

The configuration of the third embodiment will be described below. This embodiment is basically provided with a similar configuration to that in the first embodiment, however, the configuration of this embodiment is different in a situation of connection to an external storage and program module configuration.

FIG. 11 shows the hardware configuration of a data processing server 100 in this embodiment. As the configuration of an original data management server 107 and a communication line 106 is the same as that in the first embodiment, they are not shown. An external storage 1100 that stores backup data for random reading is connected to the data processing server 100 in addition to an external storage 105 for storing backup data shown in FIG. 1.

Figure 12:
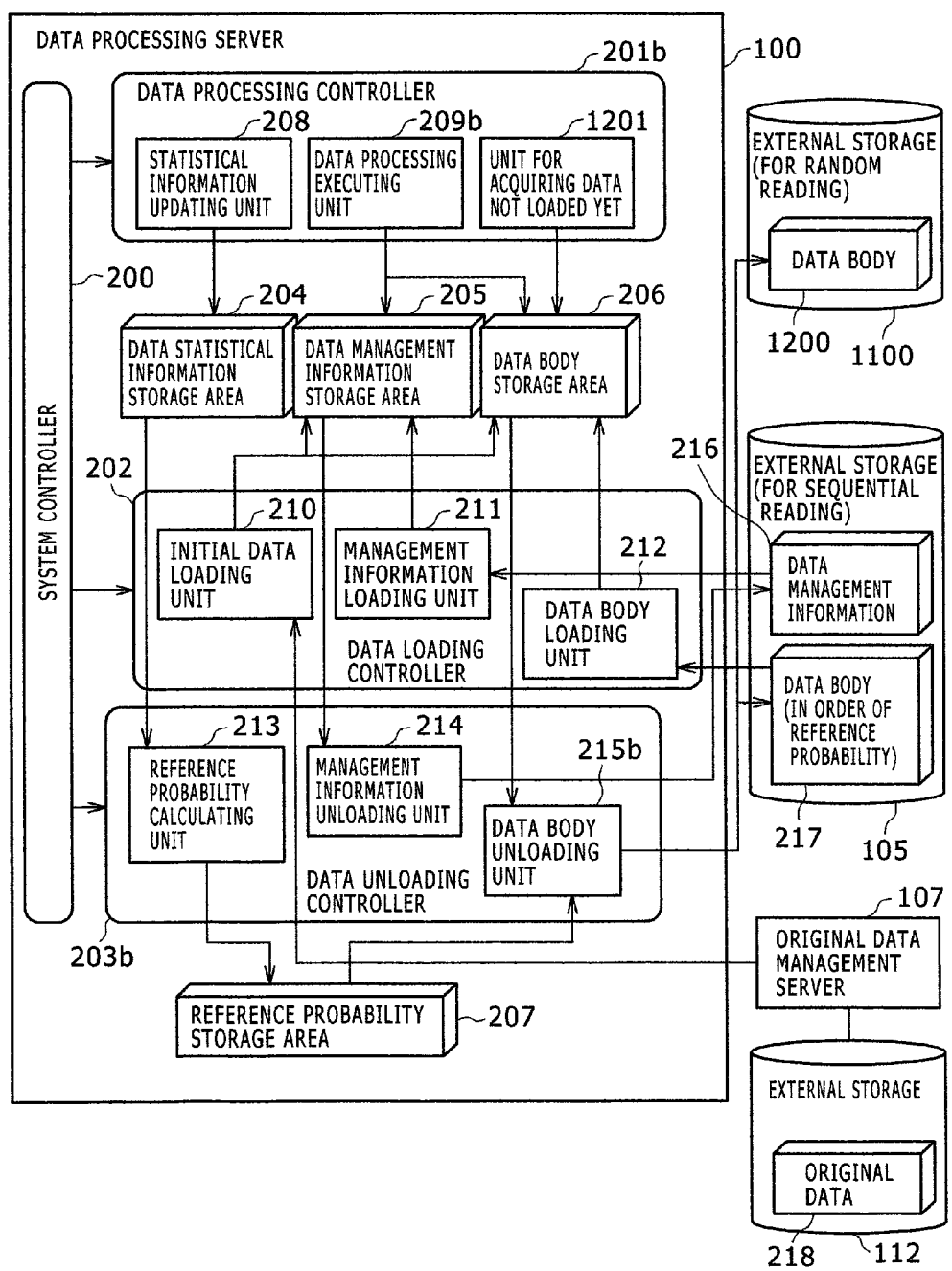
FIG. 12 shows the module configuration of the third embodiment.

FIG. 12 shows a module configuration in this embodiment. In the data processing server 100 in this embodiment, each processing program as a system controller 200, a data processing controller 201b, a data loading controller 202 and a data unloading controller 203b is stored, and a data statistical information storage area 204, a data management information storage area 205, a data body storage area 206 and a reference probability storage area 207 are secured.

The data processing controller 201b includes a statistical information updating unit 208, a data processing executing unit 209b and a unit for acquiring data not loaded yet 1201. The data loading controller 202 includes an initial data loading unit 210, a management information loading unit 211 and a data body loading unit 212. The data unloading controller 203b includes a reference probability calculating unit 213, a management information unloading unit 214 and a data body unloading unit 215b.

In the external storage 105 connected to the data processing server 100, data management information 216 and a data body 217 are stored as backup data. In another external storage 1100, a data body 1200 is stored. In an external storage 112 connected to an original data management server 107, original data 218 to be initial data of a data processing system is stored.

When the data processing system is first activated, the data management information 216 and the data body 217 which are respectively backup data are not stored in the external storage 105 yet. Therefore, the data loading controller 202 requests the original data 218 of the original data management server 107 and stores it in the data management information storage area 205 and the data body storage area 206. The data processing controller 201b accepts a request for processing from an external device, applies processing according to the request to the management information stored in the data management information storage area 205 of the data to be processed and a body stored in the data body storage area 206 of the target data, and updates statistical information stored in the data statistical information storage area 204 of the target data. When no data body is stored in the data body storage area 206 in starting the processing of the target data, the data processing controller searches the target data in the data body 1200 stored in the external storage 1100, stores it in the data body storage area 206, and executes the processing.

When the data processing is ended, the data unloading controller 203b stores the data management information stored in the data management information storage area 205 in the external storage 105 as data management information 216. Afterward, the data unloading controller calculates the reference probability of each data using statistical information stored in the data statistical information storage area 204 and stores it in the reference probability storage area 207. The data unloading controller stores the data body stored in the data body storage area 206 in the external storage 105 in descending order of the reference probability as a data body 217. The data body 217 is stored in a sequential area of the external storage 105 in the descending order of the reference probability. Further, the data body 1200 is also stored in the external storage 1100.

When the data processing system is activated a second time or later, the data loading controller 202 stores the data management information 216 and the data body 217 respectively stored in the external storage 105 in the data management information storage area 205 and the data body storage area 206 in place of the original data 218.

The contents of processing by the system controller 200 and the data loading controller 202 in this embodiment are similar to those in the first embodiment. Processing by the data processing controller 201b and the data unloading controller 203b different from the contents of the processing in the first embodiment will be described below.

Figure 13:
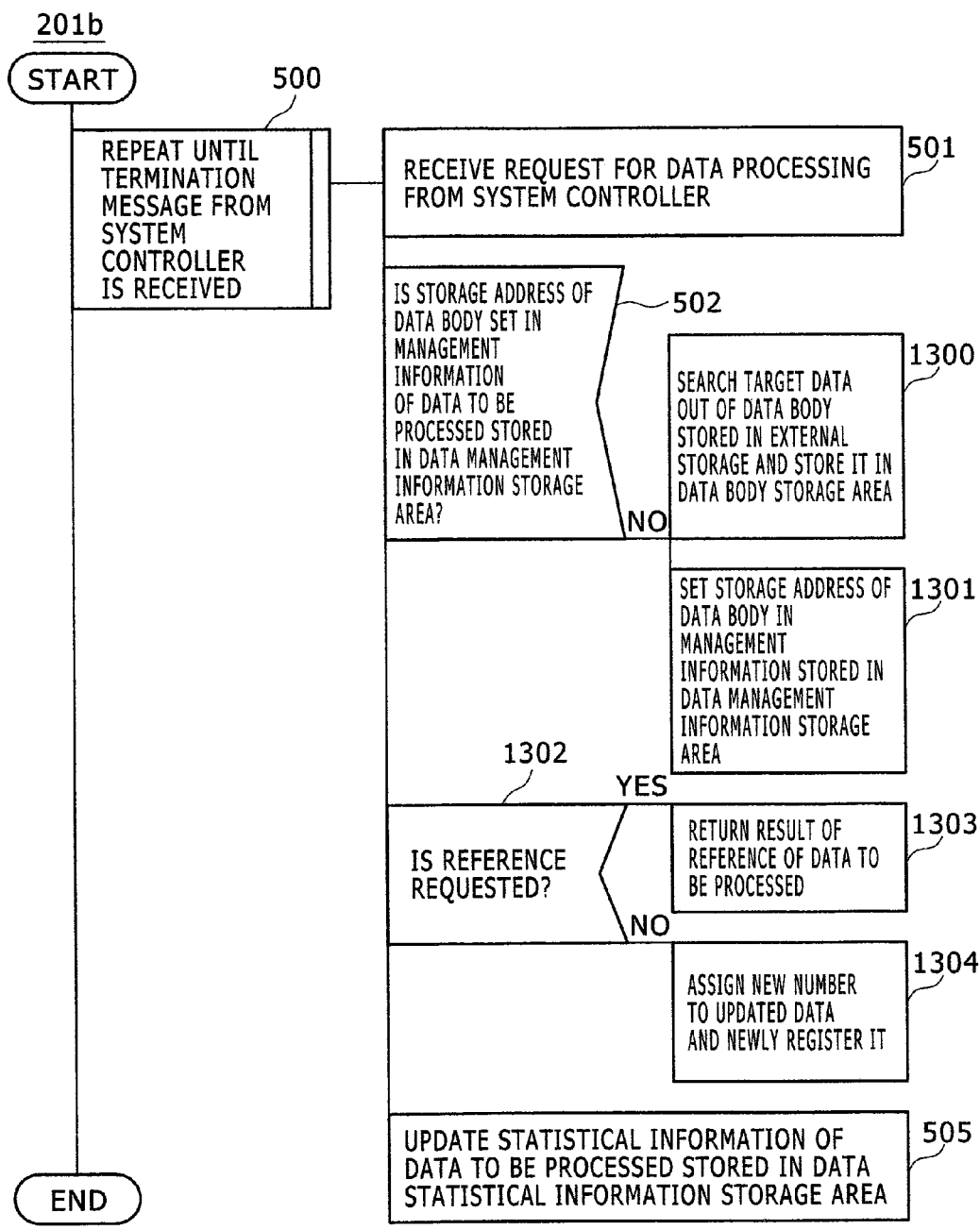
FIG. 13 is a problem analysis diagram showing the contents of processing by a data processing controller in the third embodiment.

Referring to FIG. 13, the contents of the processing by the data processing controller 201b will be described below. The data processing controller 201b is activated by the system controller 200 that receives a completion message from the data loading controller 202.

At the time of activation, as for the storage of data management information and a data body in a main memory 102, two states exist. A first state denotes a state that a data body is stored in the data body storage area 206 and management information such as a storage address of a data body is set in the data management information storage area 205. A second state denotes a state that a data body is not stored in the data body storage area 206 yet and management information such as a storage address of a data body is not set in the data management information storage area 205.

When the data processing controller 201 is activated, it repeats steps S501 to S505 until it receives a termination message from the system controller 200 (S500). The data processing controller receives a request for processing data from the system controller 200 (S501). The data processing controller checks whether management information such as a storage address of the data body which is a target of the request for processing is stored in the data management information storage area 205 or not (S502). When the management information is not set, the data processing controller activates the unit for acquiring data not loaded yet 1201, the unit searches target data in the data body 1200 stored in the external storage 1100 and stores it in the data body storage area 206 (S1300). The data processing controller stores management information such as a storage address of a body of the target data in the data management information storage area 205 (S1301).

As the body of the data to be processed is stored in the data body storage area 206, the data processing controller activates the data processing executing unit 209b to execute the requested processing. The data processing executing unit judges which of reference or updating is requested (S1302). When it is judged that reference is requested, the data processing executing unit returns a result of referring to the data to be processed to a requester of the processing (S1303). When it is judged that updating is requested, the data processing executing unit generates new data by updating the target data based upon the request for processing, assigns a new number to the new data, and newly registers it (S1304). The statistical information updating unit 208 is activated to update statistical information stored in the data statistical information storage area 204 of the data to be processed according to the contents of the processing (S505).

Referring to FIG. 14, a process for newly registering the updated data in S1304 will be described in detail below. FIG. 14 shows an example of management information stored in the data management information storage area 205. The example shown in FIG. 14 includes each item of a data number, a data name, a creation date, a data capacity, a former data number and a body storage address as management information of data. The data number is an identification number proper to individual data. The data name, the creation date and the data capacity are attribute information of data and in addition, each item of an updated date and a creator may be also added. The former data number denotes a data number of data before updating when the corresponding data is updated data. When "null" is stored in a field of the former data number, it means that no data before updating exists. The body storage address includes pointer information to a data body stored in the data body storage area 206. When "null" is stored in a field of the body storage address, it means that the data body is not loaded yet.

Statistical information stored in the data statistical information storage area 204 of data may be also managed in the same area as management information of the data. In the example shown in FIG. 14, data the data number of which is 00000002 is updated. First, entry information of the data having the data number of 00000002 is copied in fields of data having a new data number 00001203. An updated data body is stored in the data body storage area 206 and "address1203" which is pointer information to the data body is stored in a field of the body storage address. Finally, if an attribute such as data capacity varies, it is changed. When data before updating is afterward loaded from the external storage for sequential reading 105, updated data is prevented from being overwritten by assigning a new number to the updated data and managing it as described above.

Figure 15:
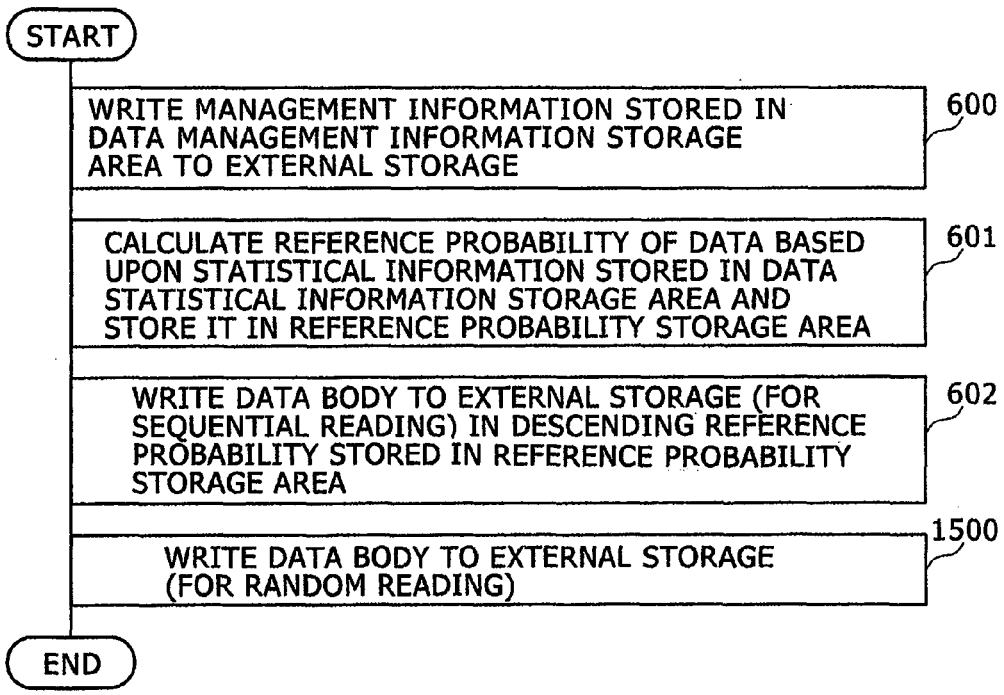
FIG. 15 is a problem analysis diagram showing the contents of processing by a data unloading controller in the third embodiment.

Referring to FIG. 15, the contents of processing by the data unloading controller 203b will be described below. The data unloading controller 203b is activated by the system controller 200 to which a system termination command is input from an input device 104. When the data unloading controller 203b is activated, it activates the management information unloading unit 214 to write the management information stored in the data management information storage area 205 to the external storage 105 as data management information 216 (S600).

The data unloading controller activates the reference probability calculating unit 213 to calculate the reference probability of data based upon statistical information stored in the data statistical information storage area 204 and to store it in the reference probability storage area 207 (S601). The data unloading controller activates the data body unloading unit 215b to write the data body stored in the data body storage area 206 to the external storage 105 in descending order of the reference probability stored in the reference probability storage area 207 as a data body 217 (S602). The data body 217 is stored in a sequential area of the external storage 105 in the descending order of the reference probability. The data body unloading unit stores the data body stored in the data body storage area 206 in the external storage 1100 as a data body 1200 (S1500). The order of storing the data body 1200 is not particularly limited.

As described above, in this embodiment, the two external storages for sequential reading and for random reading are prepared and backup data is generated in the respective external storages. When data to be processed is not loaded from the external storage for sequential reading yet, processing can be continued by reading the target data from the external storage for random reading without having an effect upon a head of the external storage during sequential reading. As a result, latency of a request for processing can be reduced without increasing time until all data is loaded.

What is claimed is:

1. A data processing method in a data processing system including an external storage and a data processing server that couples to the external storage and the data processing server includes a main memory and processes data in the main memory, the method comprising the steps of:

a system controller of the data processing server is activated on the main memory by an OS activated by the data processing server, and independent of whether processing of the data is requested or not, executing a data processing control unit which receives, from the system controller, a request of the processing of the data in parallel with execution of a data loading control unit which continuously reads and loads onto the main memory a series of data including the data stored in a descending order of reference probability on the external storage; and if the data corresponding to the request for processing is not loaded into the main memory by execution of the data loading control unit, executing a process corresponding to the request of the processing for the data loaded on the main memory by the data processing control unit, after the data is loaded into the main memory by the data loading control unit;

wherein in response to entry of a system end command, the system controller making the data processing control unit end data processing, and executing an unloading control unit which unloads the series of data from the main memory to the external storage;

wherein the unloading control unit calculates the reference probability which is acquired based on at least one of an input information from an input device coupled to the data processing server and a statistical information related to the processing of the data; and wherein the unloading control unit unloads, in the descendent order of the reference probability, the series of data including the data onto the external storage from which data is read out continuously in the descendent order of the reference probability by the data loading control unit.

2. The data processing method according to claim 1, wherein statistical information related to the processing of the individual data includes at least one of a processed frequency of the individual data and a processing date of the individual data.

3. The data processing method according to claim 1, further comprising the step of:

sequentially reading the series of data to be loaded into the main memory from the external storage in the descending order of the reference probability in response to the reactivation of the data processing system to resume processing of the series of data unloaded into the external storage by the data processing system.

4. The data processing method according to claim 1, further comprising the step of:

in response to the storage in the main memory of the individual data sequentially read from the external storage in the descending order of the reference probability, setting a storage address in the main memory of the individual data in management information for managing the individual data.

5. The data processing method according to claim 4, wherein the management information is stored in a storage area which is a non-volatile memory included in the main memory.

6. The data processing method according to claim 1, further comprising the step of:

unloading the individual data as the series of data from the main memory into another external storage in the descending order of the reference probability.

7. The data processing method according to claim 6, further comprising the step of:

loading the series of data unloaded into the external storage into the main memory in response to the reactivation of the data processing system to resume processing by the data processing system, receiving another request for processing other target data in parallel with the execution of sequentially reading the series of data loaded into the main memory from the external storage in the descending order of the reference probability; and if the other target data corresponding to the another request for processing is not loaded into the main memory, reading the other target data from the another external storage to the main memory.

8. A data processing system including an external storage and a data processing server that couples to the external storage and the data processing server includes a main memory and applies processing to data in the main memory, comprising:

a data loading controller executed by a system controller of the data processing server, independent of whether processing of the data is requested or not, continuously reading and loading onto the main memory a series of data including the data stored in a descendent order of a reference probability on the external storage; and a data processing control unit receiving, from the system controller, a request of the processing of the data in parallel with execution of a data loading control unit;

wherein if the data corresponding to the request for processing is not loaded into the main memory by execution of the data loading control unit, executing process corresponding to the request of the processing for the data loaded on the main memory by the data processing control unit, after the data is loaded into the main memory by execution of the data loading control unit;

wherein in response to enter a system end command, the system controller makes the data processing control unit to end data processing, and executes an unloading control unit which unloads the series of data from the main memory to the external storage;

wherein the unloading control unit calculates the reference probability which is acquired by evaluating the simplicity of reference in numeric value, based on at least one of an input information from an input device coupled to the data processing server and a statistical information related to the processing of the data; and wherein the unloading control unit unloads, in the descendent order of the reference probability, the series of data including the data onto the external storage from which data is read out continuously in the descendent order of the reference probability by the data loading control unit.

9. The data processing system according to claim 8, wherein statistical information related to the processing of the individual data includes at least one of a processed frequency of the individual data and a processing date of the individual data.

10. The data processing system according to claim 8, wherein the data loading controller sequentially reads the series of data to be loaded into the main memory from the external storage in the descending order of the reference probability in response to the reactivation of the data processing system to resume processing of the series of data unloaded into the external storage.

11. The data processing system according to claim 10, wherein the data loading controller sets a storage address in the main memory of the individual data in management information for managing the individual data in response to the storage in the main memory of the individual data sequentially read from the external storage in the descending order of the reference probability.

12. The data processing system according to claim 11, wherein the management information is stored in a storage area which is a non-volatile memory included in the main memory.

13. The data processing system according to claim 8, wherein the unloading controller unloads the individual data from the main memory into the external storage in the descending order of the reference probability as the series of data; and the unloading controller unloads the individual data from the main memory into another external storage.

14. The data processing system according to claim 13, wherein if the series of data unloaded into the external storage is loaded into the main memory by the data loading controller in response to the reactivation of the data processing system to resume the processing of the data processing system, the data processing controller receives another request for processing other target data in parallel with sequentially reading the series of data loaded into the main memory from the external storage in the descending order of the reference probability by the data loading controller; and if the other target data corresponding to the other request for processing is not loaded into the main memory, the data processing controller reads the other target data from the another external storage to the main memory.

* * * * *